Nov. 29, 1955  E. J. NICHOLL  2,725,077
HYDRAULIC SLIDE VALVE

Filed Dec. 12, 1951 3 Sheets-Sheet 1

Inventor
EDWARD J. NICHOLL

By Reynolds, Beach &
Christman
Attorneys

Nov. 29, 1955  E. J. NICHOLL  2,725,077
HYDRAULIC SLIDE VALVE
Filed Dec. 12, 1951  3 Sheets-Sheet 2

Inventor
EDWARD J. NICHOLL
By Reynolds Beach &
Christensen
Attorneys

United States Patent Office 2,725,077
Patented Nov. 29, 1955

2,725,077

HYDRAULIC SLIDE VALVE

Edward J. Nicholl, Cheltenham, England, assignor to Dowty Equipment Limited, Cheltenham, England Application December 12, 1951, Serial No. 261,240

Claims priority, application Great Britain December 19, 1950

2 Claims. (Cl. 137—623)

This invention relates to hydraulic slide valves of the kind used for example in aircraft hydraulic control systems, in which a servo-operated slide member in one selected position effects communication from a liquid pressure line into one of two service lines and from the other service line into a return line, and in another selected position reverses the communications with the service lines.

The invention seeks to provide reversing valves of the kind referred to, incorporating improved selective control mechanism.

According to the invention, a slide valve of the kind referred to comprises two fluid-pressure-operated servo devices with pilot-valve mechanism for controlling said devices, one of the servo devices acting upon selected operation of said mechanism to displace the slide member to a corresponding side of its neutral position, and the second servo device acting upon neutralization of said mechanism to restore the slide member to its neutral position. By the term "neutralization" is meant the act of returning the pilot-valve mechanism to a state in which neither operative position is selected, or of allowing said mechanism to return to this state.

In a preferred construction the servo devices are made separate from the slide member, and each comprises two oppositely acting pistons disposed at opposite end portions of the slide member, thus enabling a symmetrical construction of the valve to be made. Furthermore, by making the pistons of one servo device annular in shape, with the respective pistons of the other servo device mounted within them, a compact arrangement is obtained.

The invention is illustrated by way of example in the accompanying drawings, of which:

Figure 1:
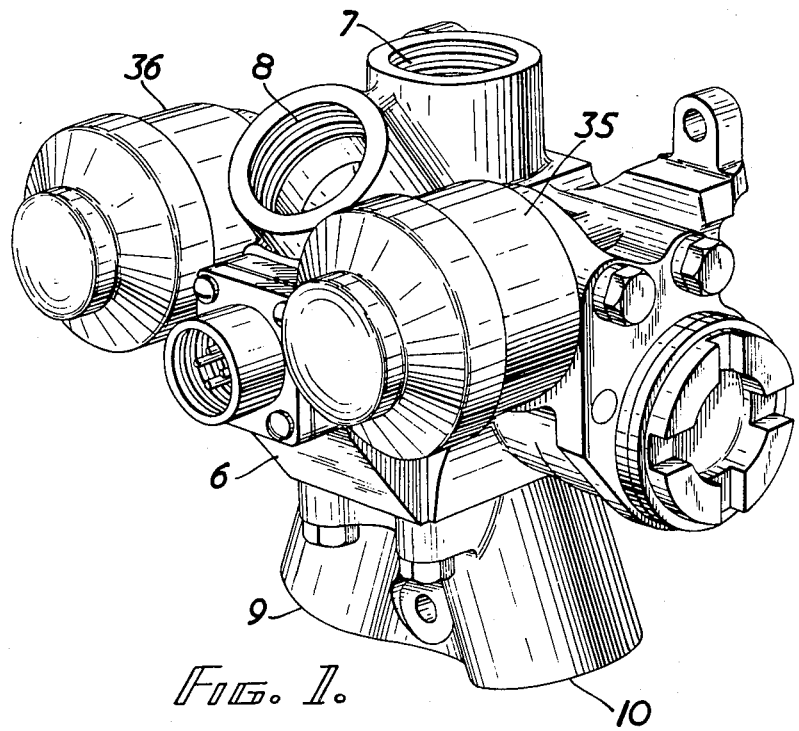
Figure 1 is a perspective view of a hydraulic slide valve fitted with operating solenoids.
Figure 3:
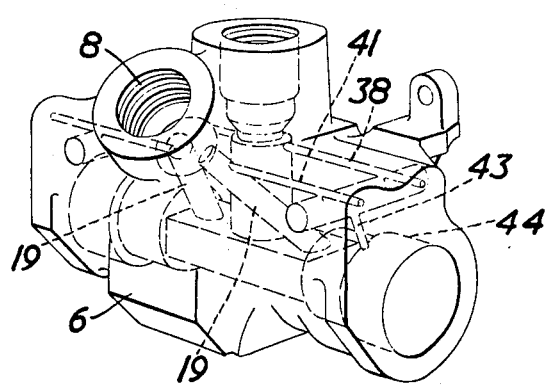
Figure 3 is a perspective diagram of the valve body showing the liquid passages in the valve.

Referring to Figure 1, the valve has a body 6 formed with four bosses wherein are provided a socket 7 for the liquid-pressure supply connection, a socket 8 for the return connection, and sockets 9 and 10 for the service connections to a component or circuit to be controlled by the valve. The sockets 9 and 10 communicate with service ports 11 and 12 respectively, Figure 2, which open into a flat face 13 disposed within the valve body 6. Opposite this face 13, a cylindrical bore 14 formed in the body 6 communicates with the socket 7. A hollow piston 15 is mounted within the bore 14 and is pressed downwards by a coil spring 16 against a slide member 17 which works over the ported face 13. A slot 18 formed centrally in the slide member 17, controls communication of pressure liquid through the hollow piston 15 into one or other of the ports 11 and 12 depending upon the direction of displacement of the slide member 17 from its neutral position, in which neutral position the port 18 communicates with neither port 11 nor 12. The space surrounding the lower portion of the hollow piston 15 is connected by way of a pair of low-pressure ducts 19, Figure 3, with the socket 8 for the return line. Both end portions of the slide member 17 are thus exposed permanently to the low pressure in the return line and the under-face of the slide member is relieved at each end by means of a step 21 which ensures that either the port 11 or 12 will be connected with the return line in a displaced position of the slide member 17.

The slide member 17 is preferably in the form of a rectangular block and by preference has a recess 22 cut back at each end for a purpose to be explained. The slide member 17 is actuated by two servo devices comprising respectively one pair of centralizing pistons 23, 24 of annular shape disposed at opposite ends of the slide member 17 in the valve body 6, and another pair of displacing pistons 25 and 26 mounted in the annular centralizing pistons 23 and 24 at each end of the slide member 17, these displacing pistons 25 and 26 having stems 27 and 28 respectively adapted to engage the base of each recess 22 in the slide member 17. The bores in which the centralizing pistons 23 and 24 are mounted, are closed at each end by screw caps 29 and 30 respectively, the screw portions of which form outer limit stops for the centralizing pistons 23 and 24, and the central parts of which form outer limit stops for the displacing pistons 25 and 26 respectively. The limits provided by these several stops are such as to enable the displacing pistons 25 and 26 in turn to displace the slide member 17 from one extreme position to another for reversing the direction of liquid flow through the ports 11 and 12. The centralizing pistons 23 and 24 are each adapted to engage the sides of the slide member 17 which project endwise beyond the recess 22, and each annular centralizing piston 23 or 24 is free to travel outwardly when the slide member is moved in the same direction, but the inward movement of the centralizing pistons 23 and 24 is limited by steps 31 and 32 respectively at the ends of the bores in which these pistons are mounted, these steps 31 and 32 being separated by a distance equal to the overall length of the slide member 17. When therefore, both centralizing pistons 23 and 24 are held by liquid pressure against their respective steps 31 and 32, they serve positively to locate the slide member 17 in its neutral position at which the service ports 11 and 12 are isolated from both the supply line and the return line.

Figure 2:
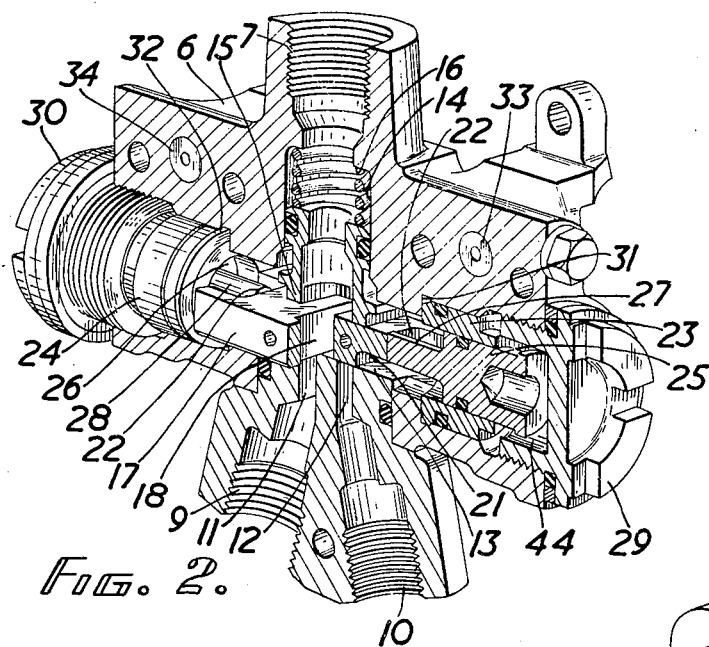
Figure 2 is a vertical partial section through the valve shown in perspective.

On the right hand side of Figure 2, part of the slide member 17 is cut away to show the stem 27 of the sectioned displacing piston 25 abutting the corresponding recess 22 in the slide member 11. On the left hand side of Figure 2, the centralizing piston 24 which is shown in full abuts the sides of the slide member 11 which projects endwise beyond the recess 22. The valve and its parts are symmetrical with respect to a transverse plane through the axis of the supply socket 7 so that the details illustrated on one side of this plane are duplicated on the other side.

The application of liquid pressure to the outer faces of the concentric pistons 23 and 25 at one end of the valve, and the concentric pistons 24 and 26 at the other end, is controlled by pilot-valve mechanism which consists of similar pilot-valves 33 and 34, shown generally in Figure 2, and valve-operating solenoids 35 and 36 respectively, shown in Figure 1.

Figure 4:
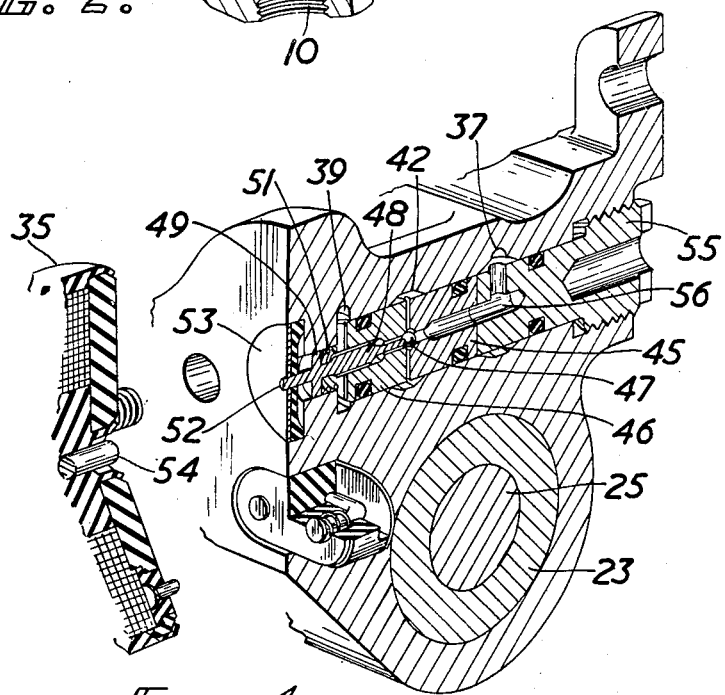
Figure 4 is a perspective sectional view to an enlarged scale through the axis of a pilot-valve incorporated in the main valve.

The pilot-valve 33 shown sectionally in Figure 4 comprises an assembly of parts mounted in a bore in the body 6. The bore has one undercut 37 leading through a duct 38, Figures 3 and 5, to the cylindrical bore 14 and hence to the supply connection 7, a second undercut 39 leading through a duct 41 (again, see Figures 3 and 5) to the corresponding low pressure duct 19, and a third undercut 42 leading through a duct 43 (once more, see Figures 3 and 5) to the cylinder space 44 at the outer end portions of the pistons 23 and 25. The valve parts include a centrally bored pressure seating member 45 and a centrally bored return seating member 46 disposed with their adjacent faces radially grooved to provide communication from the valve space between the seatings to the surrounding undercut 42. The pilot-valve obturating member is a steel ball 47 disposed in the valve space under the control of a spindle 48 which is mounted in the return seating member 46. The spindle 48, is longitudinally grooved to afford a passage for liquid between the valve space and the radially grooved face of the seating member 46 adjacent the surrounding undercut 39. The spindle 48 further has a flange 49 engaged by a spring 51 which urges the spindle 48 away from the ball 47, while an operating head 52 of the spindle 48 projects beyond the flange 49 through a packing gland 53 which is recessed into the valve body 6. The solenoid 35, shown separated from the valve in Figure 4, serves to hold the packing gland 53 in place, while the plunger 54 of the solenoid is engageable with the spindle 48 to force the ball 47 against the pressure seating 45 when the solenoid is energised. The assembly is held in place by a retaining plug 55 which has a central bore and radial passage 56 opening into the undercut 37.

Figure 5:
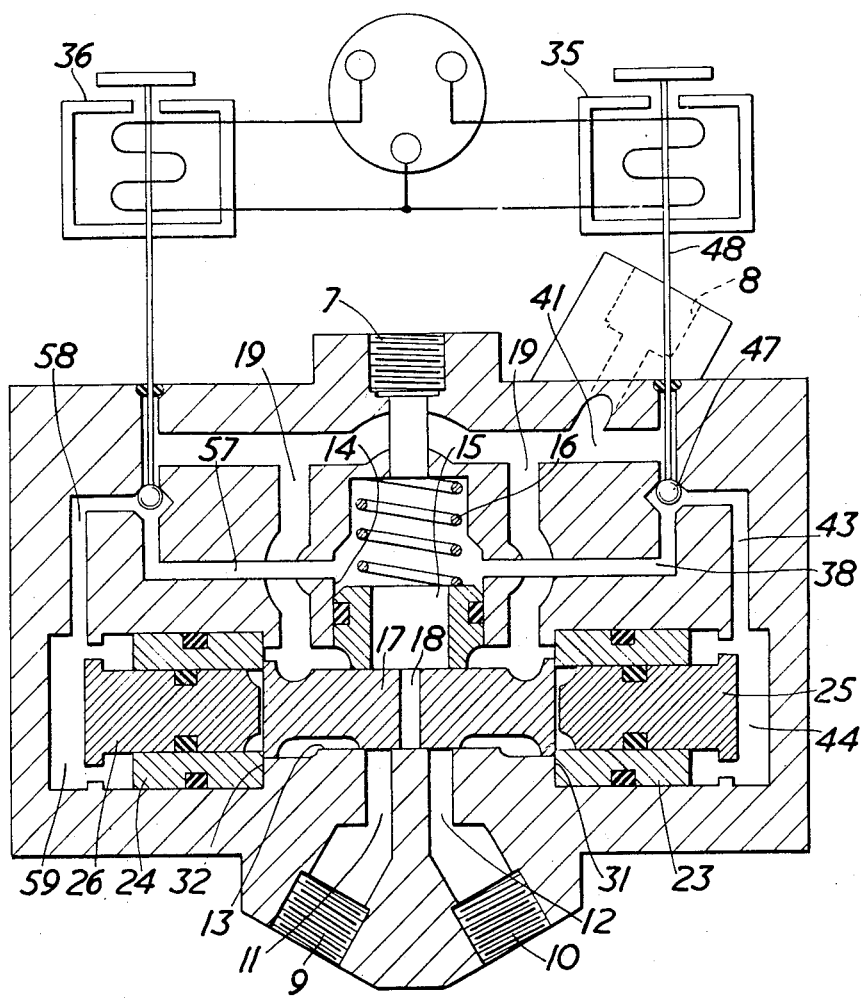
Figure 5 is an operation diagram of the hydraulic slide valve.

The manner in which the valve operates will now be described with reference to Figure 5. The valve is shown in its position of rest wherein both solenoids 35 and 36 are inactive and the liquid pressure in the pressure conduit 7 and ducts 38 and 57 holds the balls 47 and 61 respectively on their return or low pressure seats. Pressure is also admitted by way of the ducts 43 and 58 to the cylinder spaces 44 and 59 adjacent the pistons 23 and 25, and the pistons 24 and 26 respectively. The inner faces of all these pistons are exposed to low pressure by way of the ducts 19 leading to the return conduit 8, so that all four pistons press inwardly against the ends of the slide member 17. The centralizing pistons 23 and 24 seat against the steps 31 and 32 and thus positively hold the slide member 17 central in its neutral position, though the displacing pistons 25 and 26 are not restricted by stops in their respective inner positions so that they play no part in centralizing the slide member 17, yet neither are they effective at such time to displace the slide member towards one end or the other, inasmuch as each displacing piston may be considered as pressing inwardly with equal force on the slide member, thereby cancelling out any displacing force.

If now the solenoid 35 is energised, the valve spindle 48 is actuated to force the ball 47 off its low pressure seat into engagement with the high pressure seat. The duct 43 thus places the outer faces of the pistons 23 and 25 in direct communication with the low pressure return conduit 8 by way of the duct 41, so that the liquid pressure already imposed on the outer face of the piston 26 forces the slide member 17, and hence the pistons 23 and 25 also, over to the right. In this selected position of the slide member 17, the slot 18 therein places the pressure conduit 7 in communication with the service conduit 10, while the conduit 9 is at the same time placed in communication with the return conduit 8 by way of the duct 19 on the same side.

When the solenoid 35 is de-energised the ball 47 is returned by liquid pressure to its low pressure seating so that pressure is restored to the cylinder space 44. The pistons 23 and 25 therefore press against the right-hand side of the slide member 17, though since the piston 26 presses with equal force against the left-hand side of the slide member 17, the action of the pistons 25 and 26 cancel out. The centralizing piston 24, however, is out of contact with the slide member 17 and retained by the step 32, so that the centralizing piston 23 is alone instrumental in returning the slide member 17 to its neutral position.

It will be evident that operation of the solenoid 36 acts in a similar manner to displace the slide member 17 to the left so that the service conduit 9 is now connected with pressure and the service conduit 10 with return.

I claim:

1. A hydraulic valve comprising a valve body chambered to define an elongated valve space having two opposite walls, and formed with a liquid pressure conduit terminating in a pressure port at one wall of and intermediate the ends of the valve space, also with two service conduits leading from ports spaced longitudinally at the opposite wall of such valve space, and also with a liquid return conduit leading from the interior of said valve space, a slide valve seated on and slidable lengthwise of the service-ported wall, within the valve space, but spaced from the pressure-ported wall thereof, said slide valve having a single through port located, when the slide valve is centralized, in alignment with the pressure port and intermediate the service ports, but shiftable, as the slide valve shifts alternatively into each of two limit positions, into registry with the respective service ports, a hollow sealing piston received within the pressure port and biased for projection therefrom into sealing engagement with the slide valve's face which is opposite that face which seats upon the service-ported wall of the valve space, and of a size, in the direction of the slide valve's movement, to maintain communication with the through port in all positions of the slide valve, the slide valve having also return passages located, when the slide valve is centralized, out of communication with either service port, but in communication through the valve space at all times with the liquid return conduit, the valve body having a bore at each end of and in prolongation of the valve space, the axis whereof is parallel to the service-ported wall of such valve space, an abutment stop terminating each bore at the end thereof adjacent the valve space, two concentric pistons, one slidable within the other, mounted in each bore, each inner concentric piston, constituting a valve-displacing piston, being located to engage with said slide valve and to displace its through port from its centralized position to a limit position wherein it is in communication with one of the service ports, and its exhaust passage is in communication with the other service port, and each outer concentric piston, constituting a valve-centralizing piston, being located to engage with said slide valve and with said abutment step to determine the central position of said slide valve, and pilot-valve mechanism operative selectively to control the application of liquid pressure to the concentric pistons at one end of the slide valve or to the concentric pistons at the other end, or simultaneously to the pistons at both ends.

2. A hydraulic valve as in claim 1, wherein said pilot-valve mechanism comprises for each side of said valve, a pilot-valve space in the valve body, openings from said valve space consisting of a pressure conduit seating, a return conduit seating disposed opposite said pressure conduit seating and intermediate said seatings a duct communicating with the outer faces of the concentric pistons on the corresponding side of the valve body, a free spherical closure member movable in said valve space to engage said pressure conduit seating or said return conduit seating, and solenoid means including an armature operative to displace said closure member from the return conduit seating on to the pressure conduit seating.

References Cited in the file of this patent

UNITED STATES PATENTS

| | | | |
|---|---|---|---|
| 2,157,240 | Keel | May 9, | 1939 |
| 2,234,009 | Robinson | Mar. 4, | 1941 |
| 2,357,986 | Wichterman | Sept. 12, | 1944 |
| 2,369,505 | Ward | Feb. 13, | 1945 |
| 2,394,487 | Rotter | Feb. 5, | 1946 |
| 2,491,402 | Tucker | Dec. 13, | 1949 |
| 2,507,868 | Purcell | May 16, | 1950 |
| 2,601,990 | Holzer | July 1, | 1952 |
| 2,669,417 | Ray | Feb. 16, | 1954 |

FOREIGN PATENTS

| | | |
|---|---|---|
| 598,884 | Great Britain | 1948 |